United States Patent [19]
Rubinstein

[11] Patent Number: 6,010,011
[45] Date of Patent: Jan. 4, 2000

[54] FLOTATION APPARATUS FOR MINERAL PROCESSING

[76] Inventor: Julius Rubinstein, Sirenevuy Blvd. 36 Apt 20, Moscow, Russian Federation, 105077

[21] Appl. No.: 09/170,238

[22] Filed: Oct. 13, 1998

[51] Int. Cl.[7] .............................. B03D 1/24; B03D 1/14; C02F 1/24

[52] U.S. Cl. ................... 209/168; 209/170; 210/221.2; 210/322

[58] Field of Search ................................... 209/168, 170; 210/221.2, 322

[56] References Cited

U.S. PATENT DOCUMENTS 3,312,346  4/1967  Walker .
3,419,493  12/1968  Pangle, Jr. .
3,773,179  11/1973  Hurst .
3,898,150  8/1975  Russell et al. .
5,282,538  2/1994  Moys .
5,431,286  7/1995  Xu et al. .

FOREIGN PATENT DOCUMENTS

290139  3/1963  Netherlands .
440161  2/1975  U.S.S.R. .

Primary Examiner—Thomas M. Lithgow
Attorney, Agent, or Firm—Alfred E. Miller

[57] ABSTRACT

Flotation equipment for mineral processing having a single column with multi-sections or chambers in which the partitions between chambers can be moved for optimum hydrodynamics resulting in the separation of different particles in each chamber which rises to the top of the chambers entrained with air bubbles to form froth layers. Provision is made for processing large particles in at least one of the chambers.

12 Claims, 7 Drawing Sheets

FLOTATION APPARATUS FOR MINERAL PROCESSING

The present invention relates to an apparatus or device and method for column foam flotation for mineral processing principally of non-ferrous metals, rare metals and coal but also can be used in other disciplines, such as the effluent treatment of waste water. The pulp feed or slurry is fed into the intermediate part of the column wherein the particles of high floatability are attached to air bubbles and proceed to the top of the column while the other free particles gravitate to the bottom of the column.

Previous foam floatation devices were of the of the rectangular-shaped mechanical type utilizing a rotating impeller positioned near the bottom of the tank with an air intake in the vicinity of the impeller and a slurry feed in the upper part of the tank. A later device was used which eliminated the mechanical impeller but used a tall monocell column having a slurry feed above the position of the air feed. In both the mechanical type and the column described above the air feed created bubbles which generated a foam that attached to certain particles in the slurry causing the particles to become less wet and thereby float to the surface of the slurry to be taken or skimmed off. However, the non-selectable particles which in most cases are constituted of desirable, recoverable material, were drawn off as takings in the bottom of the tank.

Under realistic industrial conditions the floatability of both valuable material or particles and garbage particles vary considerably. In order to recover these other valuable materials it was necessary to pipe these materials or different particles into a number of tanks connected in series until all the various particles, for example, mineral elements were drawn off each succeeding tank.

The above known construction requires more material to construct and occupies a large floor area. Furthermore, the long flow requirements through the multiple tanks in series increases the possibility of plugging of the apparatus.

The above problems have, to some extent, have been addressed in applicant's Soviet Union Patents 478616; 738676 and 1118413 in which it was realized that a change from a monocell provided favorable conditions for separation of particles of various floatability.

It is an object of the present invention to provide a multi-sectional single column flotation apparatus in which the geometry of the various sections can be changed in order to provide the most favorable conditions for separation of particles of various floatability. In order to accomplish this desirable result a particular hydrodynamic and aeration system or arrangement is established in each section of the column according to the floatability of the material to be processed.

A further object of the present invention is to provide an apparatus for intensive processes in which the geometry of each section can be changed to result in the most efficient recovery of selected particles particularly in the mineral processing field.

Another object of the present invention is to provide counter current flow and co-current flow in the various sections of the flotation column with provision for selecting the flow pattern for most efficient recovery of the selected particles.

Another feature of the present invention is to provide a separate airlift arrangement in at least one of the co-current sections of the flotation column for lifting coarse particles to the froth layer in the top of the column.

A further feature of the present invention is to provide an operable diaphragm in a partition between two sections of the flotation column in which the opening can be selectively changed in order to improve the circulation of the feed or slurry for better flow distribution and recovery of selected particles.

It is an object of the present invention to provide a single floatation column with a cylindrical housing having a working area divided into sections in which the size of the complete apparatus is reduced by 3 times while the wall thickness of columns is reduced by five times resulting in substantial savings in material for construction as well as a considerable reduction in space requirements.

It is a further feature of the present invention to provide a multi-sectional single column flotation device in which different hydrodynamics can be provided in each section to create favorable conditions for intensively separating particles of different floatability, and the number of sections in each column can be changed depending on the characteristics of each column and depending on the characteristics of each of the materials to be separated out, and consequently is an important improvement over the known and traditional flotation columns which have the same hydrodynamic system in every column.

It is a further object of the present invention to provide a multi-sectional flotation column having cost, space, and energy savings.

DESCRIPTION OF THE DRAWINGS

In order that the present invention will be entirely understood, it will now be disclosed in greater with reference to the accompanying drawings in which.

DESCRIPTION OF THE PREFERRED EMBODIMENTS

Figure 8:
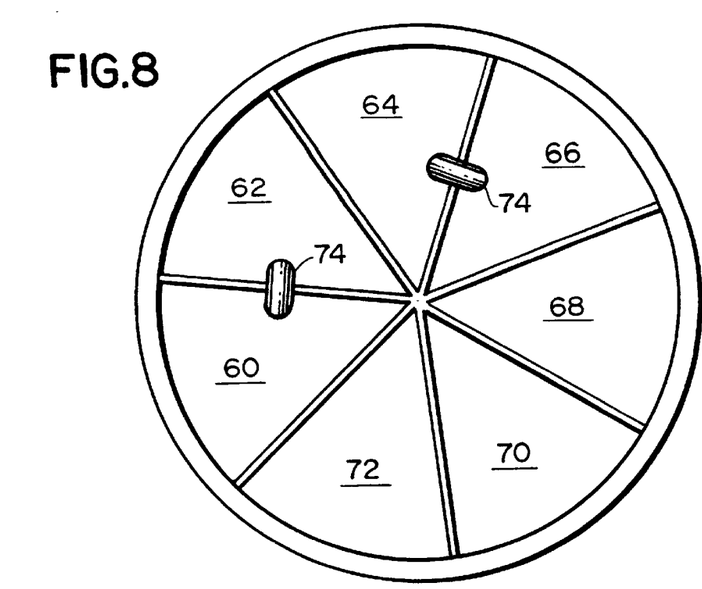
FIG. 8 is a top plan diagrammatic view of my multi-sectional flotation column showing a path of the concentrate as well as the path of the scavenger flowing in the column.
Figure 9:
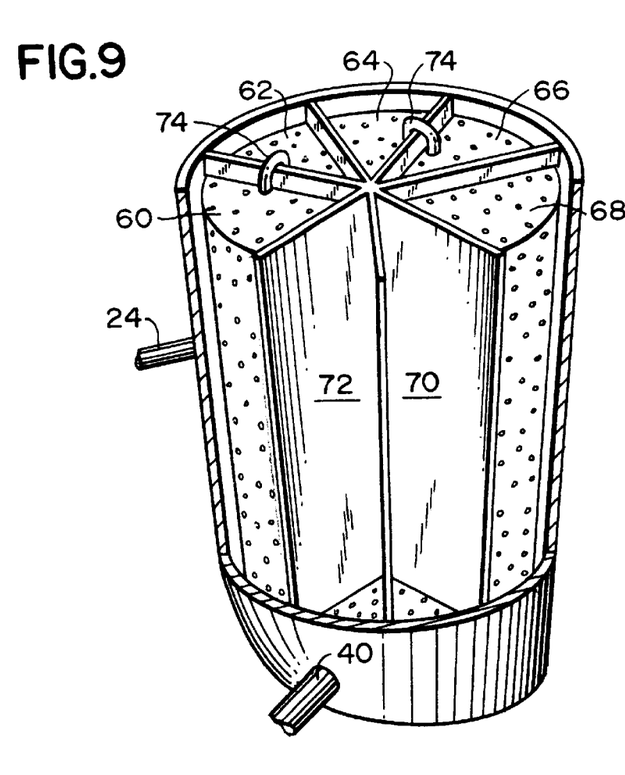
FIG. 9 is a perspective view, broken away, of the multi-sectional column shown in FIG. 8.
Figures 10, 11, 12, 13:
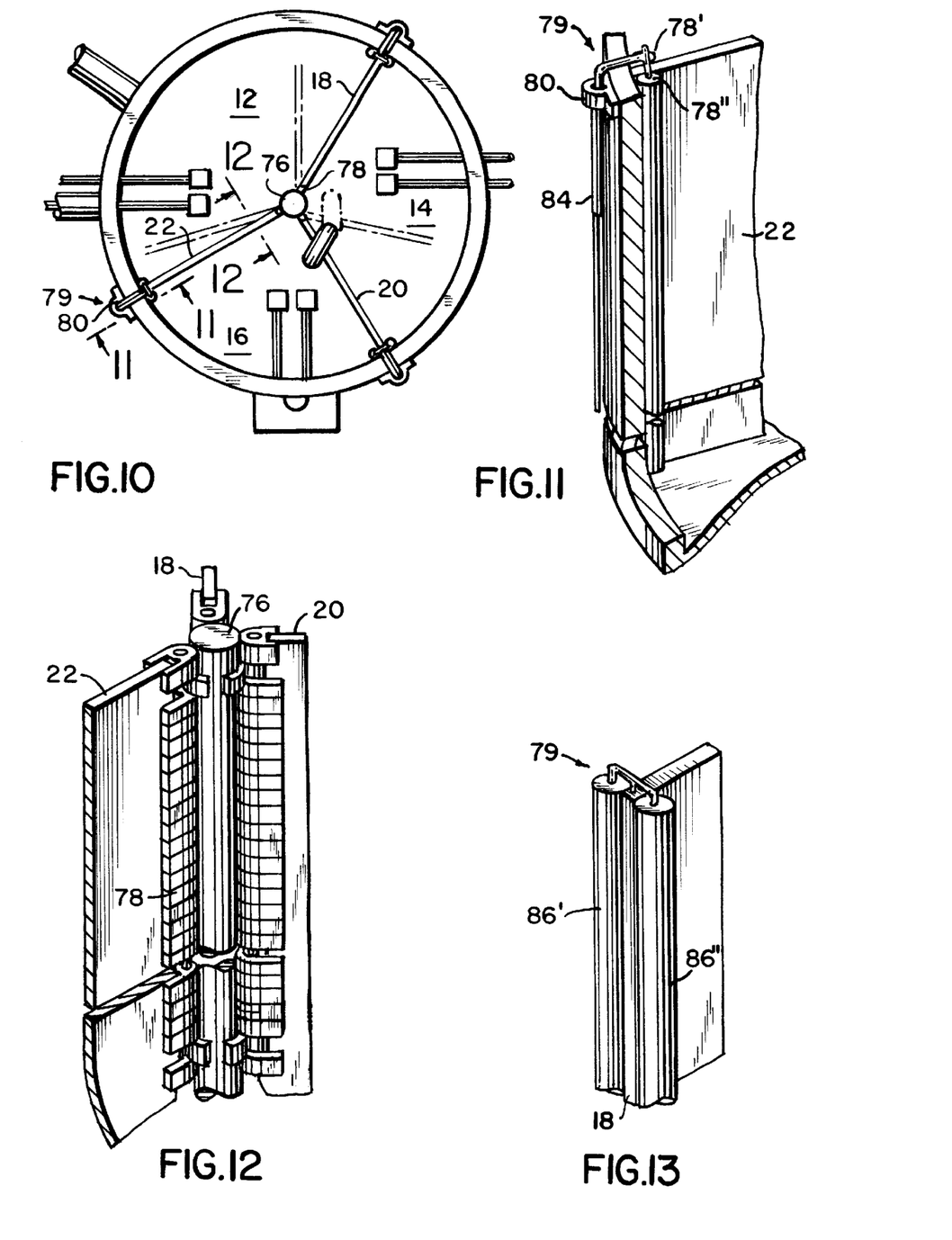
FIG. 10 is a top plan diagrammatic view of the embodiment of my present invention in which the partitions are shown in their movable mode.
FIG. 11 is an enlarged view taken along the lines 11—11 of FIG. 10.
FIG. 12 is an enlarged view taken along the lines 12—12 of FIG. 10, showing the hinge construction of one of the partitions.
FIG. 13 is a further embodiment of the present invention in which is a partial perspective is shown of a partition having a seal on the free end of the partition which is adapted to seal the partition against the inner surface of the flotation column.

As seen in FIGS. 1–4, the multi-sectional flotation column is referred to generally by reference numeral 10, and although there is only a single column it is separated into a number of separate sections or chambers, 12, 14 and 16. It should be noted that although only three chambers are shown in FIGS. 1–4, more chambers may be selected depending on the number of particles to be separated out of the feed stock. For example, FIGS. 8 and 9 show a column having seven chambers or sections. It should also be noted that the geometry of each chamber can be changed to suit the floatability characteristics from the feed by moving any of the partition walls 18, 20 and 22, as seen in FIG. 10.

Figure 4:
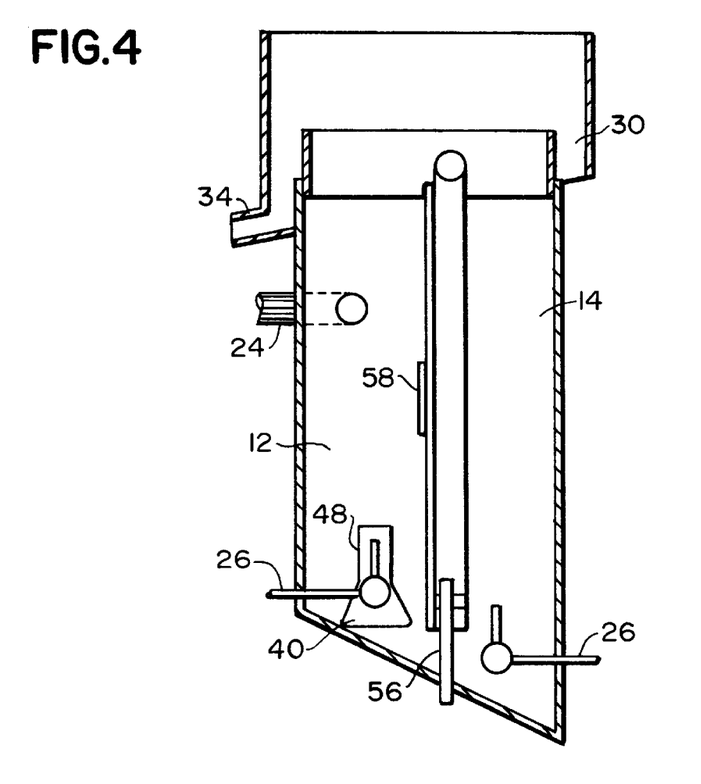
FIG. 4 is a sectional view of a separate arrangement in a co-current section of a flotation column for lifting coarse particles to the froth layer of the column.

The pulp feed enters the column at inlet 24 located about one quarter of the distance to the top of the chamber 12. An aerator 26 in the form of a sprayer having a combination of air and water is located in the bottom of each chamber and generates bubbles which attach to particles and the entrained particles, due to optimum aerodynamic conditions in the chamber, travel upwards to the top of the column to form a froth layer 28 in a froth launderer receptacle in the top of the column, as seen in FIG. 4.

Figure 1:
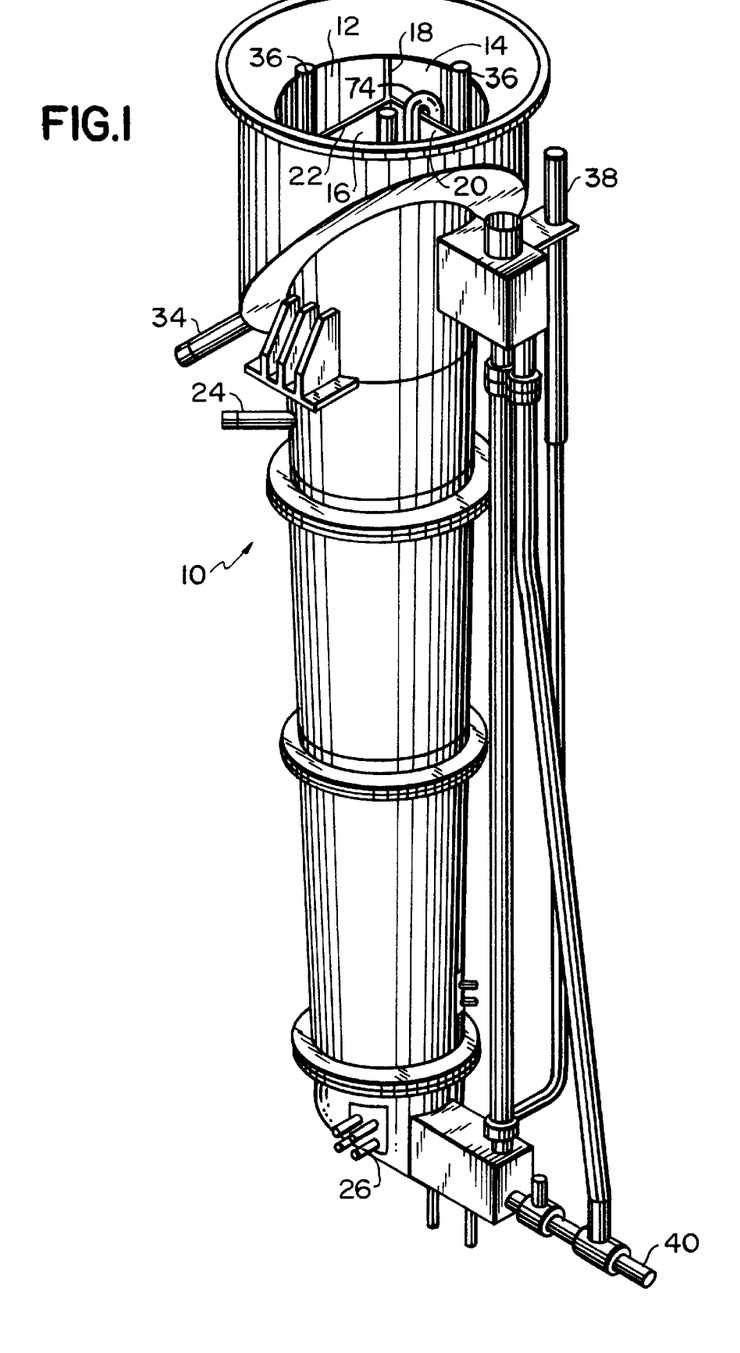
FIG. 1 is a diagrammatic view of a multi-sectional flotation column constructed in accordance with the teachings of my invention.

The froth product is collected in a froth launderer 30 on the top of the column, and the froth can be taken off the launderer through the froth outlet 34. The wash water enters the receptacle through pipes 36, as seen in FIG. 1 in order to assist in recovery of the mineral ores.

The column 10 is provided with a level control 38, and the tailings remaining in the feed exit from the column at outlet 40.

The aerator 26 permits the air flow rates to be controlled, but also air bubble size distribution in the flotation chamber or cell.

Figure 2:
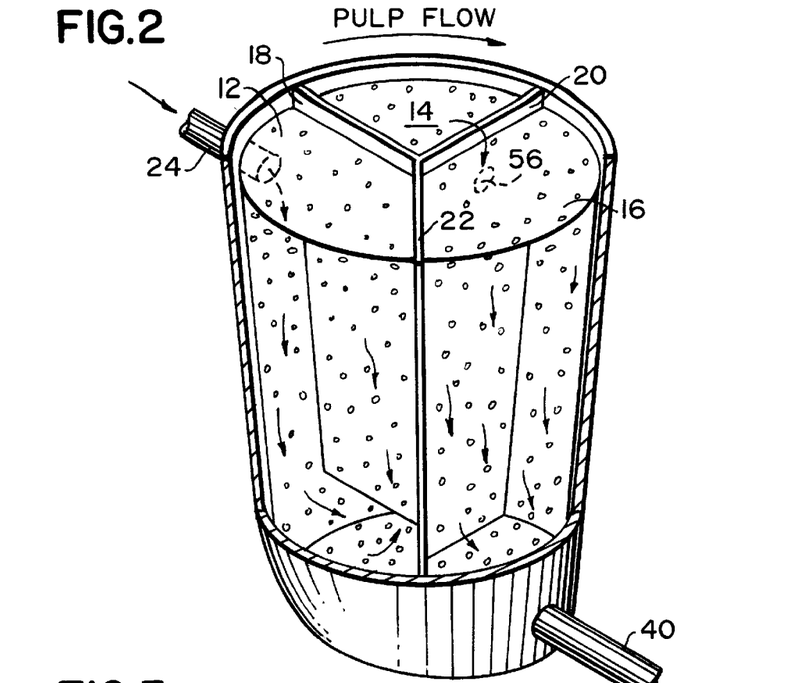
FIG. 2 is a top plan view of my multi-sectional column flotation device.

It will be evident from FIG. 2 that the pulp flow in the succeeding chambers of a cylindrical column is in a clockwise direction and flows above and over the partitions between chambers 14 and 16, and the tailings are taken off the outlet 40 in chamber 16. Since the aerator devices are located in the bottom of the respective chambers, the liquid flow is counter-current in chamber 16. The bubble particle attachment is clearly shown in FIG. 2.

Furthermore, the aerators 26 in the chambers control not only the air flow rate but also the air bubble size distribution in each chamber.

As the feed travels from each chamber to the next, the various fine and coarse particles in each chamber are selected for flotation and the configuration and operational variables in each chamber are custom made for optimum of the selected material. Thus, the process parameter can be changed for each chamber or section of the column.

Figure 5:
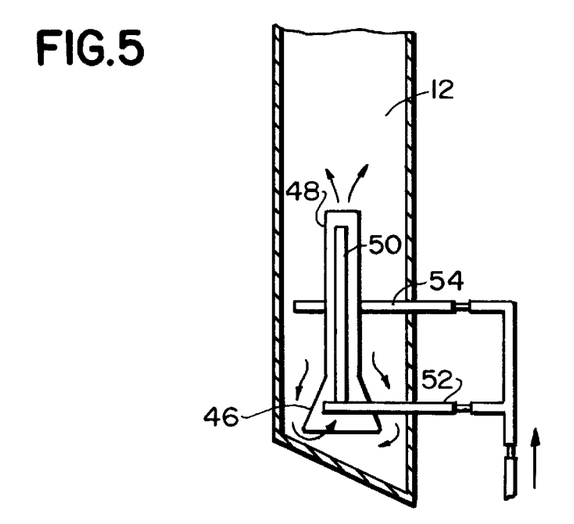
FIG. 5 is a sectional view of a separate arrangement in detail in a counter-current section of a flotation column.

As seen in FIG. 4 and more particularly in FIG. 5, the airlift is installed in a counter-current section such as chamber 12, in order to organize the flow in the vicinity of the aerator 26 so as to increase the time of flotation of the particles having low floatability. The device is located under the aerator 26 and is in the form of a truncated cone 46 having a vertical pipe 48 attached to the top of the cone. An airlift 50 is provided with an air supply 52 while the pipe 54 provides air to the aerator 26. Thus, the cone 46 and pipe 48 in combination provides for circulation of the pulp feed.

As also seen in FIG. 4, the airlift 56 is provided to lift the coarse particles to the top portion of the column in the co-current section. The pipe 74 is the top portion of the airlift pipe and is flexible so that it directs the feed material selectively to various different sections of the column, as seen in FIGS. 8 and 9. The bottom of the airlift 56 is located in the bottom of chamber 14 of the multi-sectional column. Moreover, a diaphragm 58 is shown for further selectively controlling the process by revising the feed flow path in order to optimize the flotation process and improve the circulation for better mineral recovery.

Figure 6:
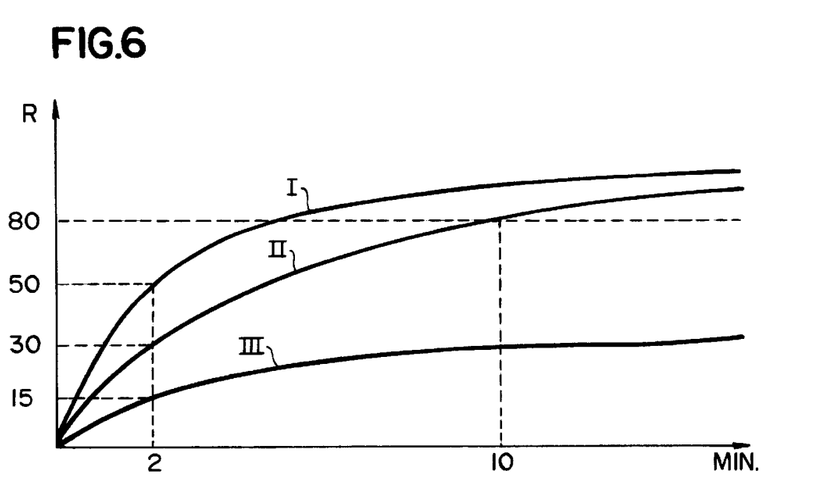
FIG. 6 is a graph showing the recovery rate of the various minerals being processed in the present flotation column plotted against time.
Figure 7:
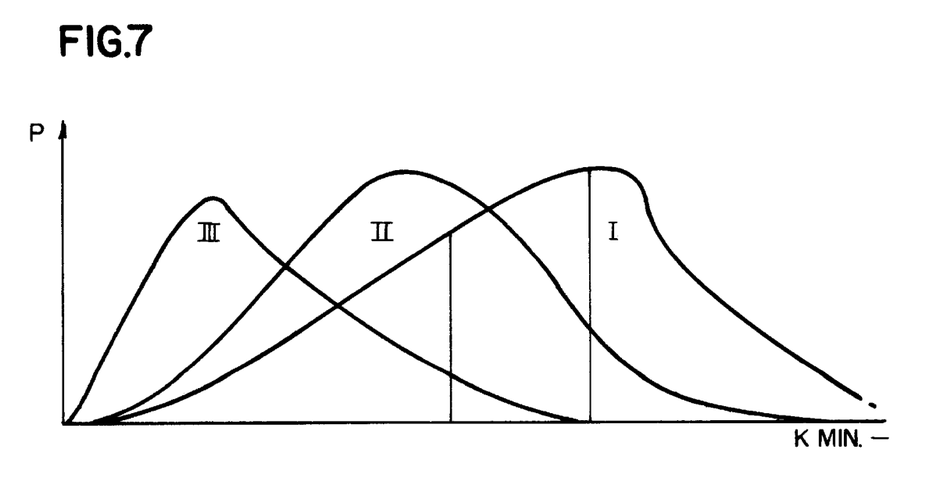
FIG. 7 is a graph showing various floatability evaluation curves of different materials being processed n the column.

Referring now to FIG. 6, a graph is shown in which recovery rate percentage is plotted against time in minutes, for various ores, for example, such as copper, nickel and zinc and identified as curves I, II and III. FIG. 7 is another graph showing the floatability distributions of the mineral ores I, II and III of FIG. 6 to be floated out of the feed stock.

Figure 3:
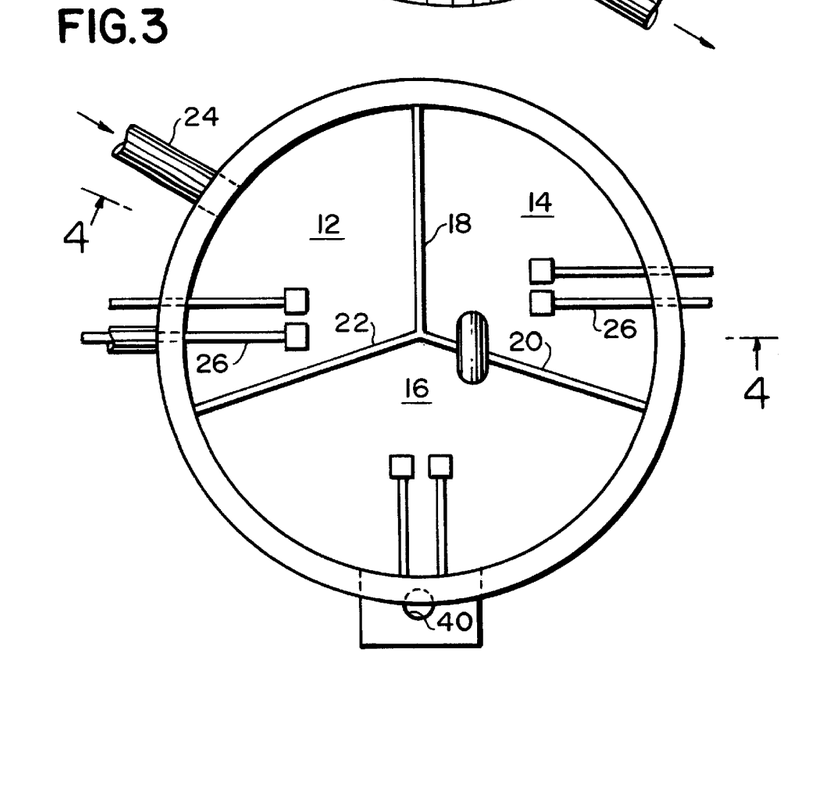
FIG. 3 is a sectional view taken along the lines 3—3 of FIG. 2.

Referring now to FIGS. 8 and 9 in which a multi-sectional flotation column with seven sections 60, 62, 64, 66, 70 and 72 is shown, the adjustment of the particles between chambers or sections, for example as seen in FIG. 3 can be altered and the parameters of each section can be changed, and in the froth layer the froth product can be recleaned whereby different flotation circuits can be handled in the same column. The regulation of the height of the partitions 18, 20 and 22 shown in FIG. 3 between the chambers or sections in the froth layers permits one to organize the recleaning of the froth product or to combine flotation plans in the one apparatus on the basis of two parameters of regulations, being the height of partitions and distribution of the airlift product in the co-current chambers or sections. The top portion 74 of the airlift 56 is installed in the co-current chamber of section of the apparatus and being flexible can direct coarse particles which form sediment on the bottom of the co-current chamber to different sections of the column.

The multi-sectional flotation column, as seen in FIG. 2, is divided by partition walls 18, 20 and 22. As particularly seen in FIGS. 1 and 12, the partition walls are movable to change the geometry of the sections of chambers 12, 14 and 16 by means of the pivotable walls 18, 20 and 22, which are connected to center post 76 by full length hinges 78 so that each partition wall can freely pivot in order to change the dimensions of the particular chamber so as to optimize the flotation process and to improve the circulation of the slurry for better mineral recovery.

Each of the partition walls 18, 20 and 22, which are hinged to the center post 76 are swingable in either a counter-clockwise or a clock-wise direction, as shown by the dotted lines in FIG. 10, to the pre-selected locations depending upon the desired dimensions of each chamber or sections 12, 14 or 16. When the partitions are in selected locations, and as seen in FIG. 11, a pneumatic double seal referred to generally by the reference numeral 79, is employed for each partition which has a slidable bracket 80 that is capable of moving along the outside of the column 10 adjacent to the top thereof and is connected to both seal 78' and 78" located at the opposite edges of the free end 82 of each of the walls 18, 20 and 22. The seal 78 is provided with an air valve 84 located on the outside of the column 10.

An alternate construction of the seal for each partition wall is seen in FIG. 13. In that construction the seals 86' and 86" are located at the sides of the partition walls adjacent to the free end 82. It should also be noted that the seals shown in FIGS. 11 and 13 are cylindrical in configuration and extend the entire length of either column 10, as seen in FIG. 10, or the entire length of the free end of a partition wall, as seen in FIG. 13, so that there is an effective seal between the sections or chambers of the column 10.

Figure 14:
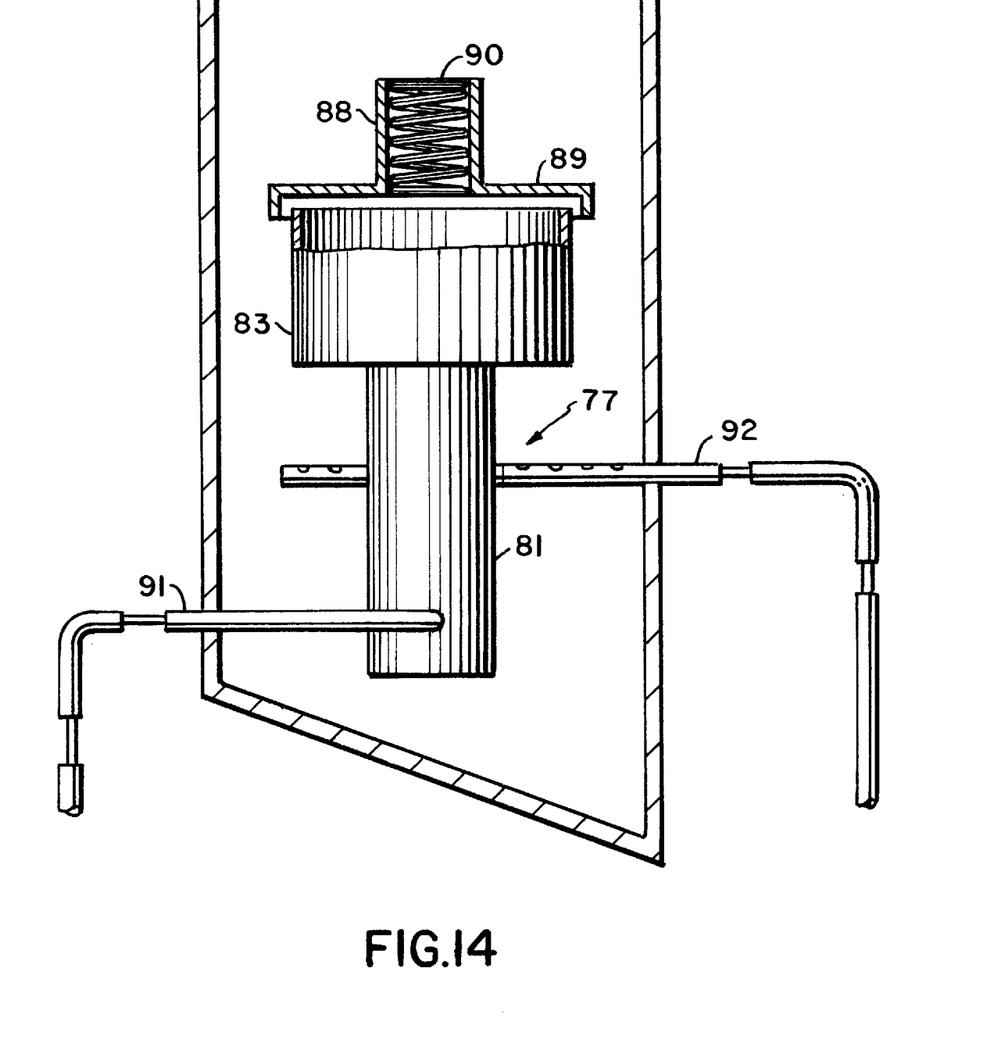
FIG. 14 is a diagrammatic view of an alternate design of the device shown in FIG. 5.

Referring now to FIG. 14, an improved design for the device shown in FIGS. 4 and 5 is shown wherein an airlift device is installed in a counter-current section of the flotation column 10 which comprises a vertically extending pipe referred to generally by the reference numeral 77 having different cross sections. The bottom portion 81 of the pipe has a smaller cross section than the intermediate portion 83. An air supply is provided through supply lines 91 and 92, with line 91 supplying air for the air lift and line 92 supplying air to a sparger (not shown).

The air flow supplied through the portion 81 of the pipe will return the pulp present in the section to the top mineralization zone of the column. The large diameter portion 83 of the pipe functions to reduce the turbulence of the rising pulp flows along the entire cross-section of the flotation section or chamber. The topmost portion of the pipe 77 is a vertical section 88 of a smaller cross-section, and installed within the vertical section 88 is a spiral coil 90 which is placed within the opening so as to disperse the large bubbles and thus create a network of small bubbles which results in more favorable conditions for an efficient flotation process. A horizontally extending plate 86 is located above the intermediate large diameter section 80. The plate 86 is for homogeneously distributing the flow of pulp along the entire cross section of the counter-current chamber.

In the present arrangement the material apparatus feedback can be established and process variables optimized depending on the characteristics of the floated material. In order to achieve the optimum, the geometry of the individual chamber or section can be specifically designed and a particular hydrodynamic and aeration regimen devised.

Although the present invention has been disclosed and described with reference to several embodiments thereof, it should be apparent that other variations and modifications may be made, and it is intended that the following claims cover said variations within the true spirit of the invention.

What is claimed is:

1. A flotation apparatus for mineral processing having a single column provided with a central post, a plurality of partitions forming three separate flotation chambers in said column, the configuration of each chamber being selected for optimum flotation of minerals to be floated, means for swingably connecting one end of each of said partitions to said central post whereby the partitions may be selectively moved to change the area of said separate flotation chambers, means to seal the free end of said partitions against the inside wall of said column, an inlet in the upper portion of a first chamber to feed a feed pulp material, means for generating air bubbles in each of the three chambers in the column whereby at least some of the bubbles which rise up in each chamber and become attached to selected minerals rise to the surface of each of the chambers to form froth layers, the flow of the feed pulp material being counter current to said rising bubbles in said first chamber, the non-floated pulp material in a second chamber being co-current with said rising air bubbles therein and flowing over the top of a partition dividing the second chamber from a third chamber, the non-floated pulp material flowing over the top of said partition dividing the second chamber from the third chamber flows to said third chamber wherein said pulp flow is counter-current to the rising air bubbles in the third chamber, the remaining non-floated pulp material exists as tailings from said column, and means for unloading the floated minerals in the froth layer in each of said chambers of the column.

2. A flotation apparatus as claimed in claim 1 wherein said means for swingably connecting one end of each of said partitions is a hinge.

3. A flotation apparatus as claimed in claim 2 wherein said hinge extends along the entire one end of each of said partitions.

4. A flotation apparatus as claimed in claim 1 wherein sealing means are pneumatic.

5. A flotation apparatus as claimed in claim 1 wherein said sealing means are positioned over the top edge of said column and are slidable along the top edge of said column to a selected fixed location wherein the free end of the partition engages said sealing means at opposite sides of the free edge of the partitions.

6. A flotation apparatus as claimed in claim 1 wherein said sealing means are two sealing members with one of said members being on one side of the free edge and the other sealing member being on the opposite side of said free edge.

7. A flotation apparatus as claimed in claim 1 further comprising an airlift device having a vertical pipe including an intermediate section of large cross-section, bottom and top sections of said pipe having smaller cross-sections, an air supply to said device, and a horizontally extending plate located above said intermediate section, said plate being for distributing homogeneously the flows of the pulp along the entire cross-section of said counter-current chamber.

8. The flotation apparatus as claimed in claim 7 further comprising a coil positioned in said top section for dispensing the large air bubbles therein.

9. The flotation apparatus as claimed in claim 7 wherein said device functions to reduce the turbulence of the ascending flow of said feed material.

10. The flotation apparatus as claimed in claim 9 wherein said device creates a network in said chamber of small bubbles resulting in favorable conditions for an efficient flotation process.

11. A flotation apparatus as claimed in claim 1 wherein said column is cylindrical.

12. The flotation apparatus as claimed in claim 1 further providing an airlift device in a co-current chamber of said column to prevent plugging of the apparatus.

* * * * *